US010654218B2

(12) United States Patent
Maier

(10) Patent No.: US 10,654,218 B2
(45) Date of Patent: May 19, 2020

(54) CARTRIDGE FEEDER FOR ADDITIVE MANUFACTURING

(71) Applicant: Nathan Christopher Maier, Hayward, CA (US)

(72) Inventor: Nathan Christopher Maier, Hayward, CA (US)

( * ) Notice: Subject to any disclaimer, the term of this patent is extended or adjusted under 35 U.S.C. 154(b) by 0 days.

(21) Appl. No.: 16/555,763

(22) Filed: Aug. 29, 2019

(65) Prior Publication Data

US 2019/0381723 A1 Dec. 19, 2019

Related U.S. Application Data

(62) Division of application No. 15/191,928, filed on Jun. 24, 2016, now Pat. No. 10,414,089.

(51) Int. Cl.

*B29C 64/112* (2017.01)
*B29C 64/106* (2017.01)
*B29K 101/12* (2006.01)
*B29L 31/00* (2006.01)

(52) U.S. Cl.

CPC .......... *B29C 64/112* (2017.08); *B29C 64/106* (2017.08); *B29C 2791/005* (2013.01); *B29K 2101/12* (2013.01); *B29L 2031/753* (2013.01); *B29L 2031/772* (2013.01)

(58) Field of Classification Search

CPC .................................................... B29C 64/112
See application file for complete search history.

*Primary Examiner* — Larry W Thrower
(74) *Attorney, Agent, or Firm* — Thomas Schneck

(57) ABSTRACT

A dispenser for additive material manufacturing having a sealed cartridge with sterile material to be dispensed. The cartridge is removable from a support housing that is movable during deposition of additive material. A nozzle extending from a heated plenum below the cartridge is inserted into a sealed variable volume enclosure supporting the article being manufactured on a movable table within the enclosure.

22 Claims, 8 Drawing Sheets

27
23
19
17
31
21
25
19
35
33
39
37
15
41
11
43
45
49
51
53
13
55

CARTRIDGE FEEDER FOR ADDITIVE MANUFACTURING

CROSS-REFERENCE TO RELATED APPLICATION

This application is a divisional application of U.S. patent application Ser. No. 15/191,928 which is a continuation-in-part of prior application Ser. No. 14/614,952, filed Feb. 5, 2015 for Sterile Environment for Additive Manufacturing, now U.S. Patent Publication No. 2015/0217514, published Aug. 6, 2015.

TECHNICAL FIELD

The invention relates to dispensing of material in additive manufacturing, particularly for medical devices.

BACKGROUND OF INVENTION

Due to increasing popularity and significant technological developments in the field of additive manufacturing, it has become critical to develop an efficient dispensing system for manufacturing medical devices, food, electronics, chemicals, and components. As physicians, manufacturing professionals, and individuals make more common use of 3D printing systems, there will be a need to print many different types of devices and even tissue, using material dispensers which can simply and rapidly be exchanged to allow for printing of diverse materials. An article in New York Times, Jan. 27, 2015 entitled "The Operation Before the Operation", p. 06, describes a need for anatomical models for medicine and the use of 3D printed models.

The need for making anatomical models and actual body parts by additive manufacturing was realized many years ago. The state of the art in this field was summarized a few years ago in an article entitled "Rapid prototyping techniques for anatomical modeling in medicine" by M. McGurk et al. in Ann. R. Coll. Surg. Engl. 1997; 79; 169-174 wherein 3-D printing of models was described. Models were created by spraying liquid through ink jet printer nozzles on a layer of precursor powder, creates a solid thin slice. The printing process was repeated for each subsequent slice until the object was completed as a "green-state" part that was then fired in a furnace to sinter it. The resulting object was then further treated to make a full density part.

In recent years, the development of software for computer controlled robotic X-Y motion systems used in the semiconductor and optics industries has made 3D printing of large objects easier than in former years. Software programs such as SolidWorks, AutoCad 360, and similar software programs make layered construction of 3D objects a relatively low cost and fast task for 3D printing equipment.

To achieve 3D printing of larger objects, print nozzles are directed in the X-Y plane either by placing the object to be made on an X-Y table wherein motion is provided below the nozzles, or mounting rails above the nozzles for X-Y motion directed from above the nozzles. An example of an X-Y table for motion below the nozzles is shown in U.S. Pat. No. 5,760,500 to T. Kondo et al. wherein linear actuator or stepper motors provide independent motion to a table over the X-Y plane. Highly accurate stepper motors for this purpose are described in U.S. Pat. No. 7,518,270 to R. Badgerow and T. Lin. A 3-D printer with overhead control of nozzles is described in U.S. Pat. No. 5,740,051 to R. Sanders et al.

In either motion situation, the nozzles move in the X-Y plane relative to the printed object and also move up in the Z plane starting from a lower level and proceeding upwardly. A layer or lamella is first printed at a low level and then the next layer up is printed and so on until the model or object is completed. Sometimes two nozzles are used, including a first nozzle to spray or extrude a manufacturing material, such as a polymer, and a second nozzle to spray a support fluid for the manufacturing material, which may be soft or viscous. An example of a support fluid may be an ink jet sprayed, ultra violet light cured resin. When the manufacturing material hardens, the faster drying support fluid is dissolved out.

Use of filaments as a supply of material for additive manufacturing is known. For example, in published application 2015/0037446 the authors describe use of a gear to pull filamentary material into a dispensing head for extrusion in a 3D printer. Such a gear drive is similar to the wire drive system shown in U.S. Pat. No. 5,816,466 where consumable wire for welding is advanced by a gear drive mechanism from a reel and consumed in the welding process.

Currently, many researchers and medical industry professionals are looking to additive manufacturing by 3D printing as the future of custom manufacturing of everything from biological organs to medical devices. Additive manufacturing provides the flexibility to produce diverse items very rapidly and at much lower cost than many previous manufacturing methodologies. In particular, additive manufacturing of articles by 3D printing techniques is seen for using patient-specific and patient-derived tissue and bone and for using synthetic tissue and stem cells. One of the problems evident in additive manufacturing is incidental contamination of the manufactured object by dust, airborne particles and moisture. A variable volume sterile environment for additive manufacturing by the present inventor is disclosed in Publication No. 2015/0217514, published Aug. 6, 2015. An object of the invention was to develop a dispensing system for thermoplastic and biological materials compatible for 3D printing equipment that could be used for biological object or device manufacturing by being free of dust, airborne particles and moisture.

SUMMARY OF INVENTION

The above object has been achieved with a dispenser for additive manufacturing that features a sealed additive manufacturing material dispensing unit, including in one embodiment a filamentary material advancing means and a heating element for melting thermoplastic material from the filament and forcing the melted material into a nozzle.

In another embodiment, a sealed inkjet cartridge of a commercially available type is provided with a nozzle that directs ink droplets to a desired location. In both embodiments, the nozzle is connected to the material supply unit in a sealed manner. The nozzle is inserted into a sealed variable volume material deposition chamber wherein the nozzle is vertically movable relative to an X-Y stage within the enclosure for additive material deposition by superposed layers. In this manner, both the dispensing unit and the deposition chamber protect against dust, airborne particles and moisture in the manufacturing process. For printing of a wider stripe in the X-Y plane, two nozzles may be ganged in tandem, side by side. Spacing of the nozzles is such that material ejected from the nozzles forms a solid stripe without significant material overlap.

Alternatively, one nozzle can spray or extrude a manufacturing material and a second nozzle can spray a support material for the manufacturing material. Other nozzle combinations exist for additive manufacturing using this technology, including, but not limited to two nozzles dispensing dissimilar thermoplastic filaments while the third sprays a chemical binder. Another example is one nozzle spraying a thermoplastic poly jet material while a second nozzle extrudes or deposits bone paste and a third nozzle sprays bone binder, etc.

Material sprayed or extruded from the nozzles, which is preferably sterile, may be a filament pulled from an enclosed reel, or a fluid in a closed container. In the former situation, a filament is pulled from a sealed container in a protective sheath that is joined to a movable housing. The housing supports a drive motor and a removable cartridge containing a drive gear for advancing the filament with power from the drive motor. The cartridge supports a conduit that receives filamentary material that is driven by the drive gear. The filamentary material can be any thermoplastic or meltable bio-material that flows after heating. Bio-materials can be filamentary bone or joint substitutes or cellular materials. A fan in the housing blows air into the cartridge in the vicinity of the conduit to cool the conduit and filamentary material. A heated plenum below the cartridge, or part of the cartridge, heats the conduit to start melting the filamentary material, causing material flow into a nozzle below the heated plenum where material exits the nozzle through a bottom aperture onto a deposition layer.

The nozzle has a length wherein a heat gradient in the nozzle exceeds a heat gradient in the conduit for one-way flow of heated material out of the nozzle. For example, a short nozzle made of copper will have a steeper heat gradient than a semi-insulative conduit of similar length, so that heat will preferentially flow to the steeper heat gradient pipe, namely the nozzle, thereby extracting material from the drive gear into the conduit and out of the nozzle.

In the case of fluid print material, a closed container communicates fluid directly to an outlet, nozzle, as in inkjet printing without the need for a drive gear or heated plenum. The viscosity of the fluid material must be controlled to permit flow, yet harden after dispensing.

The advantage of the removable cartridge is that it may be removed and replaced after use by one material in favor of dispensing another material, or for cleaning, or for sterilization. This allows different print materials to be used with the same vertical motion stage for additive manufacturing without exposure to dust, airborne particles or moisture.

In summary, the present invention achieves additive manufacturing in a sterile environment by providing a sterile major expandable wall chamber for volumetric expansion of the chamber allowing XY deposition of lamellas in a sequence for forming an object. The sterile major chamber has a sealed entry for one or a pair of nozzles into to the sterile major expandable wall chamber, with nozzle motion in the Z direction in the chamber for X, Y, Z motion of the nozzle or nozzles relative to the chamber for 3D deposition and formation of objects.

DETAILED DESCRIPTION

Figure 1:
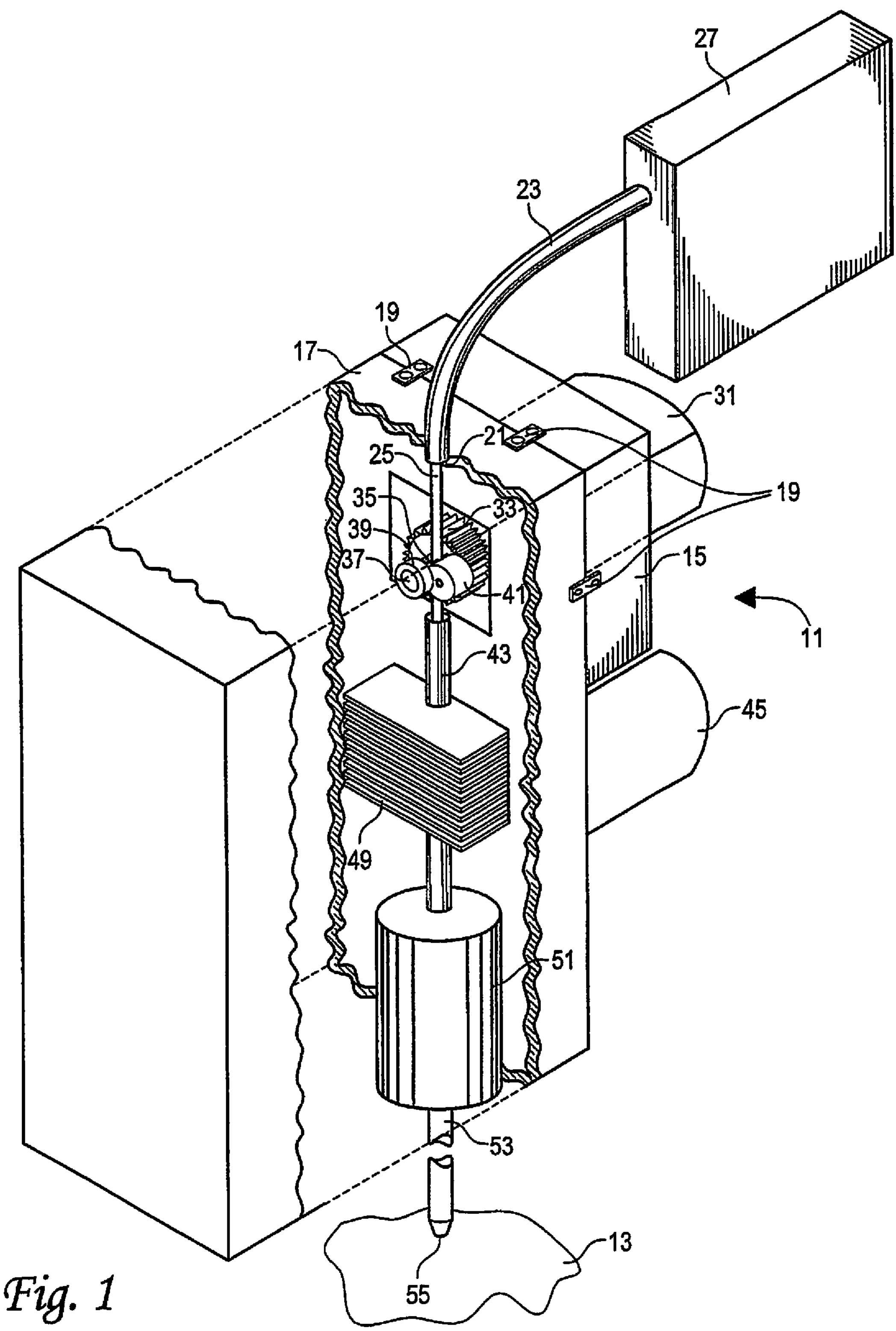
FIG. 1 is a plan perspective view of a thermoplastic dispenser with a disposable cartridge for use in 3D printing in accordance with the invention.

With reference to FIG. 1, a thermoplastic material dispenser 11 is seen to be depositing material on an article 13 being manufactured. The article is maintained in an environment free from ambient air and is thus protected from airborne particulates, moisture and molecular contamination, as will be described below. A variable volume container, described below, provides a protective environment for the article. The article 13 is manufactured by additive layer deposition wherein there is relative X-Y motion between the nozzle 53 and the article 13 in a support plane until deposition of a layer is complete. At that time, the nozzle is moved upwardly a slight distance and another layer is deposited over the first layer in a slightly different pattern controlled by a computer, not shown. Layer by layer deposition continues until a 3D article is formed.

Printers for 3D manufacturing are commercially available. Nozzle position controls and software for such printers may be used with the apparatus described herein that relates to handling of material used in the 3D printing process. What is different in the present invention is a sterile material supply and handling cartridge and a protective variable volume printed article container.

A supply reel in sealed container 27 is protected from ambient air. A fixed sheath 23 emerges from the container with an internal thermoplastic sterile, or at least very clean, filament 25 that is movable within the fixed sheath. The sheath terminates at an end distal to the container 27 in a cartridge opening 21, allowing the thermoplastic filament to move freely into the cartridge 17. In turn, cartridge 17 is removably connected to a housing 15 that can be moved up and down, either by support on a vertical beam or by a robotic handler, not shown. Fasteners 19 allow the cartridge to be attached to housing 15 but the fasteners are frangible so that once the cartridge is removed, the fasteners are broken and the cartridge cannot be replaced on the housing, except with new fasteners. This is done for safety reasons. It may be desirable to discard the cartridge and associated components once it has been used to prevent contamination of the printing system, or the cartridge may be cleaned, sterilized and refurbished with new fasteners.

Contamination of the cartridge may arise because the thermoplastic filament 25 is advanced through the cartridge by a drive gear 33 and a driven gear 35 which also becomes contaminated by contact with filamentary material. The drive gear, the driven gear, an idler 41 and a capstan 39 are all contaminated and removed with the cartridge to be discarded or cleaned. On the other hand, a drive motor 31 in housing 15 and a drive shaft 37 that projects into the cartridge and locks into a keyhole slot in capstan 39 are fixed members that are not discarded. The drive motor 31 is a stepper motor that incrementally advances thermoplastic material in the manner of a wire puller. The driven gear 35 applies its teeth to the surface of the thermoplastic material, pushing the material against idler 41. The resulting frictional engagement of the driven gear with the thermoplastic material causes the material to be pulled from the reel in container 27 and into conduit 43.

The cartridge 17 protects the thermoplastic material from exposure to ambient air and moisture. The conduit 43 passes through a fin stack 49. The fin stack has metal fins that are cooled by abutting against a thermoelectric chiller 45 in housing 15. The fin stack is removable, but the thermoelectric chiller, as part of housing 15, is retained.

Conduit 43 passes into heated plenum 51 where the thermoplastic material melts. The plenum is made of heat conductive metal and has nozzle 53 as an exit port for thermoplastic material. The melting of thermoplastic material while at the same time material is entering the plenum causes a pressure increase in the plenum, with some material attempting to back up toward the fin stack 49 which is at a lower temperature. However, there is a temperature gradient in the fin stack with lower fins being hotter and upper fins being cooler. There is also a temperature gradient at the nozzle 53. The two opposed gradients are selected so that pressure in the plenum is relieved by material flow out of the nozzle orifice 55 and material backflow into the fin stack is very limited.

Since the plenum 51, the nozzle 53 and the fin stack 49 are all connected to conduit 43 and since the interior of the plenum 51 has thermoplastic material on its walls, as does conduit 43, all may be discarded when cartridge 17 is discarded for one time use, or may be cleaned and reused. Housing 15 with drive motor 31, chiller 45, shaft 37, and plenum 51, as well as supply reel 27 with sheath 23 are retained for further use. The supply reel 27 and sheath 23 can be replaced by other thermoplastic materials and another cartridge for depositing other materials in other deposition layers.

Figure 2:
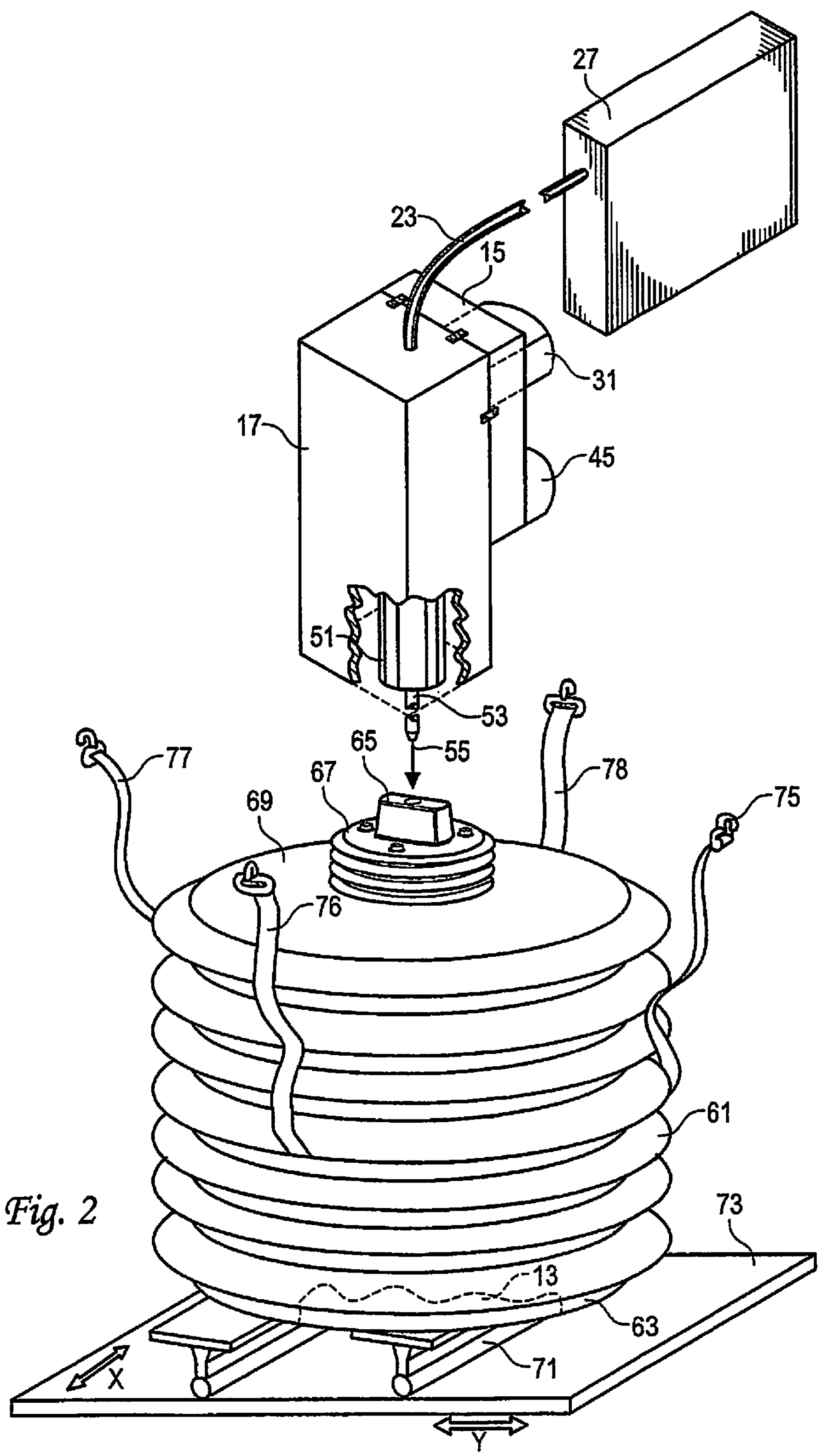
FIG. 2 is a plan view of a thermoplastic dispenser and cartridge being inserted into a bellows closed 3D printing environment.

With reference to FIG. 2, the housing 15 carrying cartridge 17, heated plenum 51 and nozzle 53 are seen approaching port 65 in dome 67. Dome 67 seals accordion pleated bellows 61 at the center of a solid lid 69 as a sealed variable volume enclosure. The cartridge 17 is secured to housing 15 which carries the drive motor 31, the chiller 45 and plenum 51. Filamentary material passes through fixed sheath 23 from the sealed container 27 towards heated plenum 51. The bellows 61 has the appearance and size of a Chinese lantern with the function of providing a protective particle and moisture free 3D printing environment for the article 13 undergoing 3D printing. The nozzle 53 is fully inserted into the port 65 so that the nozzle orifice 55 can approach the article 13 when the bellows is allowed to collapse using the support straps 75, 76, 77 and 78 for vertical control of bellows expansion and contraction. Bellows 61 may be filled with inert gas that can escape through a HEPA (or similar) filtered valve as the bellows collapse or remain connected to the inert gas source. HEPA fabric or Tyvek (TM of DuPont) provide a selective barrier material that allows changes of gas volume during processing yet maintains a sterile environment.

While the nozzle moves in the vertical or Z-direction, rails 71, supporting substrate 63 and supporting article 13, move in the X-direction as indicated by the arrowheads X. The table 73 on which the rails 71 are mounted moves in the Y-direction, as indicated by the arrowheads Y. Such X-Y tables are servo motor controlled and are commercially available. Such tables operate under control software associated with commercial 3D printers. The bellows 61 is preferably filled with an inert gas, such as helium, or partially inert gas, such as argon or carbon dioxide, before the nozzle is inserted or remain connected to the inert gas source during printing. Utilizing a bellows of material such as Tyvek will maintain sterility in the printing inner volume and yet allow air to exit or enter to vary the internal volume as the printing occurs.

Alternatively, if an air-tight bellows material is selected, a vent in the chamber with sterile filtration such a HEPA filtration material can be provided to maintain sterility while allowing for volume changes. Additionally, if the bellows is created from Tyvek or similar material folded in a "Chinese lantern" configuration as provided in U.S. Patent Publication 2015/0217514; the breathable sterile material will maintain sterility within the printing chamber.

Figure 3:
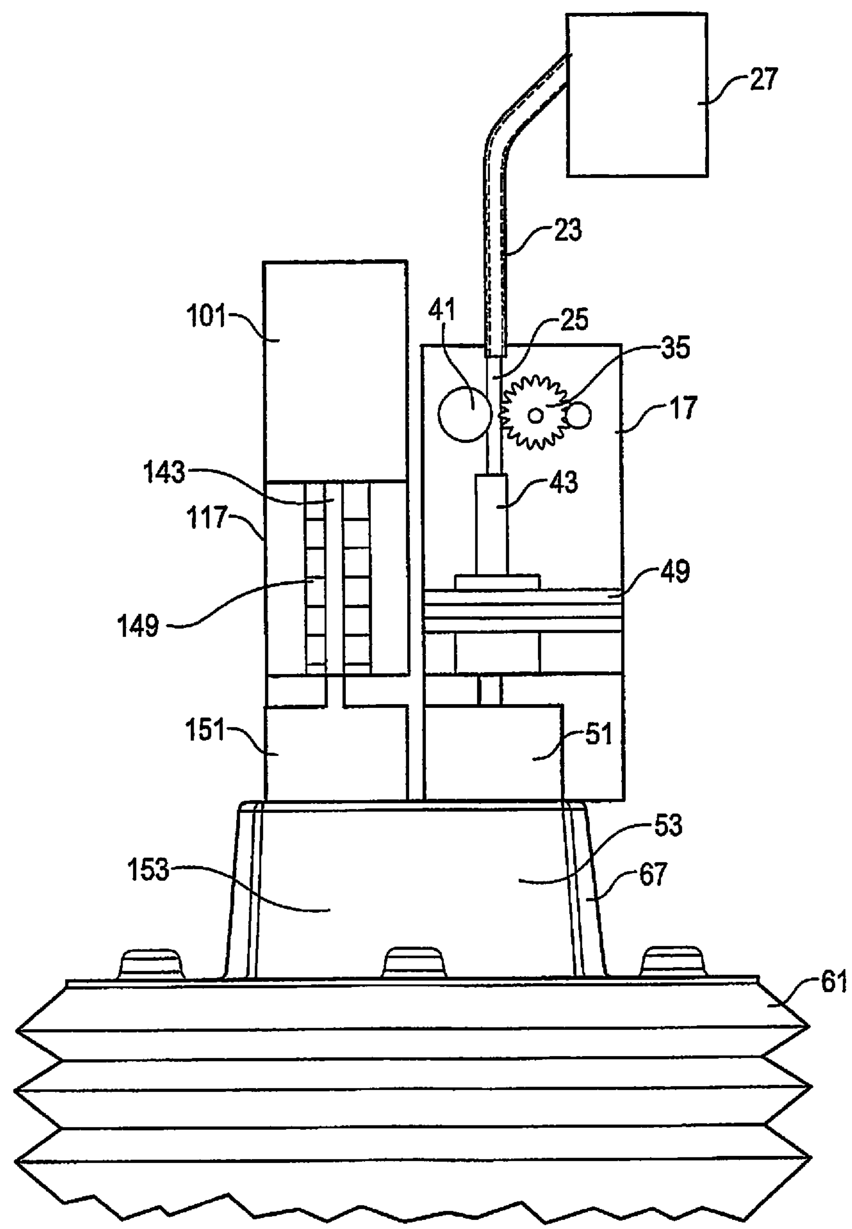
FIG. 3 is a plan view of a dual cartridge thermoplastic material dispenser seated in a closed 3D printing environment, both cartridges being of the same kind.

With reference to FIG. 3, a bellows 61 of the type shown in FIG. 2 is part of a sealed variable volume enclosure having a dome 67 supporting two housings with two cartridges 17 and 117. Cartridge 17 is the same as the cartridge shown in FIG. 1 but cartridge 117 resembles an ink jet cartridge of the kind used in commercial dot printing devices. The cartridge 117 carries an ink container 101 of the kind used in commercial dot printing but now containing a suitable ink for 3D printing. The ink may be directly injected through a conduit 143 and a nozzle 153 that are joined the ink container 101 and are part of cartridge 117.

The nozzle 153 extends into dome 67. The ink may have viscosity that requires heating in a heated plenum 151 below the fin stack 149. In this situation, ink droplets flow through conduit 143, through the fin stack 149 and into the heated plenum 151 so that the heated ink is at about the same temperature as thermoplastic material heated in heated plenum 51. By heating the ink from ink container 101 to the same temperature as the thermoplastic material, premature condensation of the ink is avoided.

Cartridge 17 uses filamentary thermoplastic material 25 from supply reel 27 arriving in the cartridge via the sheath 23 and pulled into the cartridge by driven gear 35 working against idler 41 in the manner previously described. Advancing thermoplastic material 25 goes into the conduit 43 that passes through fin stack 49, into heated plenum 51 and out through the nozzle 53 in dome 67 and into bellows 61. The two nozzles 53 and 153 cooperate in simultaneous 3D printing using diverse printing materials in a protected environment that is free from particles and microbes carried by ambient air and moisture. An article being printed is supported as shown in FIG. 2 and the bellows 61 is moved in the manner previously described.

Figure 4:
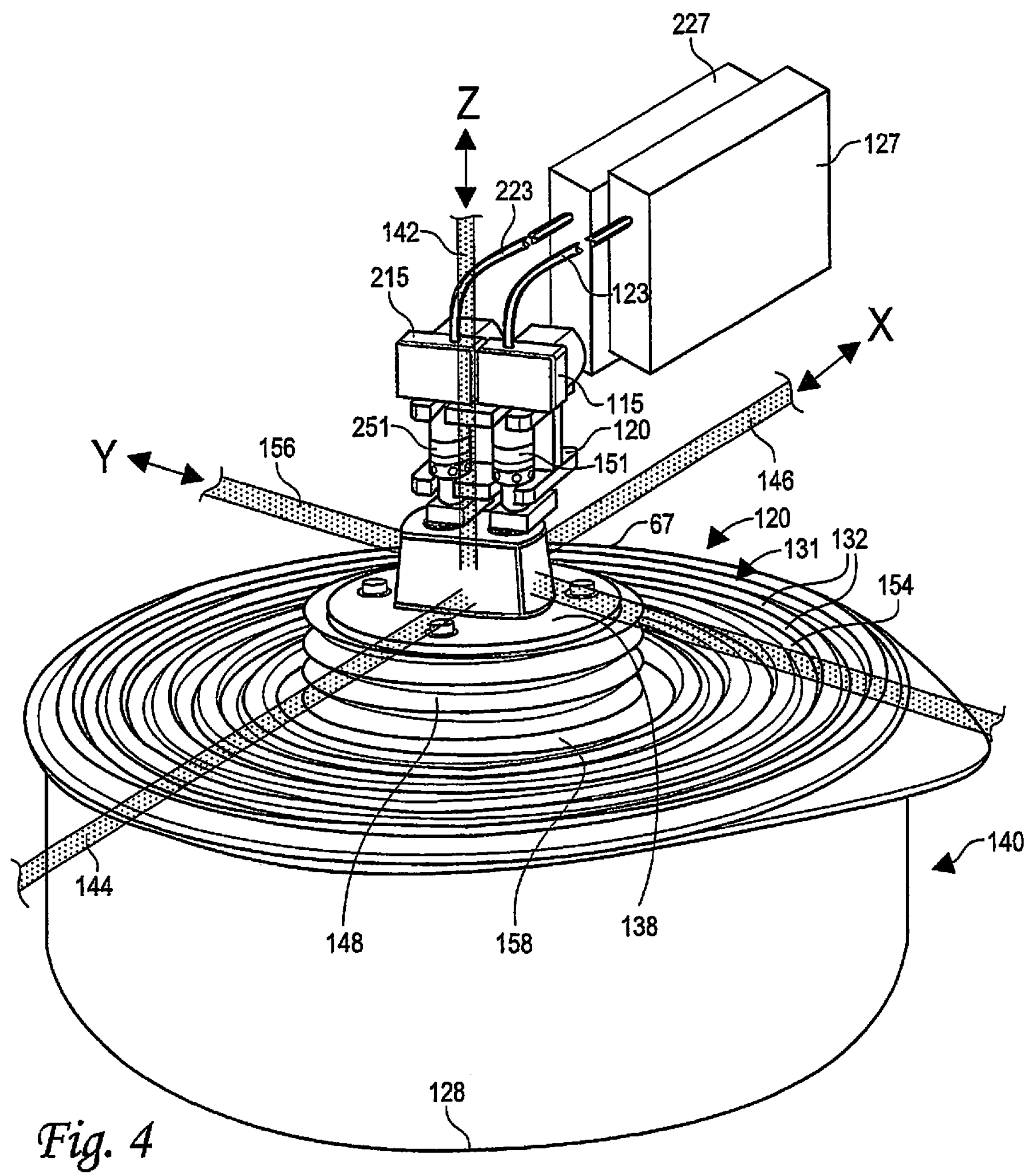
FIG. 4 is a perspective view of a dual cartridge thermoplastic material dispenser inserted in a solid side wall closed 3D printing environment.

With reference to FIG. 4, dome 67 supports a pair of tandem housings 115 and 215, each housing having components and a respective cartridge as shown in connection with housing 15 of FIG. 1. Each housing and its associated cartridge receives thermoplastic filamentary material from a respective sealed container 127, 227 through a connected fixed sheath 123, 223. The tandem housings are held on a yoke 120 that has slots for receiving the heated plenums 151 and 251 of each cartridge. Respective nozzles from each cartridge extend into dome 67.

Returning to FIG. 4, a closed print chamber 140 has a round flat bottom 128 with a fixed tubular rigid side wall 130, like a plastic microwave or refrigerator food container. The bottom 128 supports an article for fabrication. It is anticipated that a portion or nearly all of the bottom surface may be formed by a glass or plastic plate fused into the bottom of the container. This bottom plate would allow light energy to pass freely through into the bottom of the print area and could be used to impart energy to laser/UV light-activated printing materials. As such printing could occur in the inverse direction from previously described as the part and print plate rise up out of the material pool. The bottom and the side wall 130 remain fixed in place. A pleated lid 131 allows dome 67 to move up and down within side wall 130 as controlled by a rigid rod 142 that moves vertically, as indicated by arrows Z, the rod 142 connected to dome 67 on one end and to a Z-direction actuator, not shown, on the opposite end. Lateral X-Y motion of dome 67 is controlled by straps 144, 146 that push or pull dome 67 in the X direction and by straps 154, 156 that push or pull dome 67 in the Y direction. In each case, the straps are connected to dome 67 on one end and to motion actuators on opposite ends. The motion actuators on opposite ends. The motion actuators are controlled by 3D printing software in a known manner.

Pleated lid 131 may be made of an elastomeric sheet that effectively seals the print chamber 120, while allowing nozzles extending from each cartridge to come into close proximity to the article being printed. Pleats 132 are concentric about dome 67 except at a central region 158 where a stack of pleats of elastomeric material forms a mini-bellows 148 capped by a solid lid 138 to which the dome 67 is attached in a sealed manner.

Figure 5:
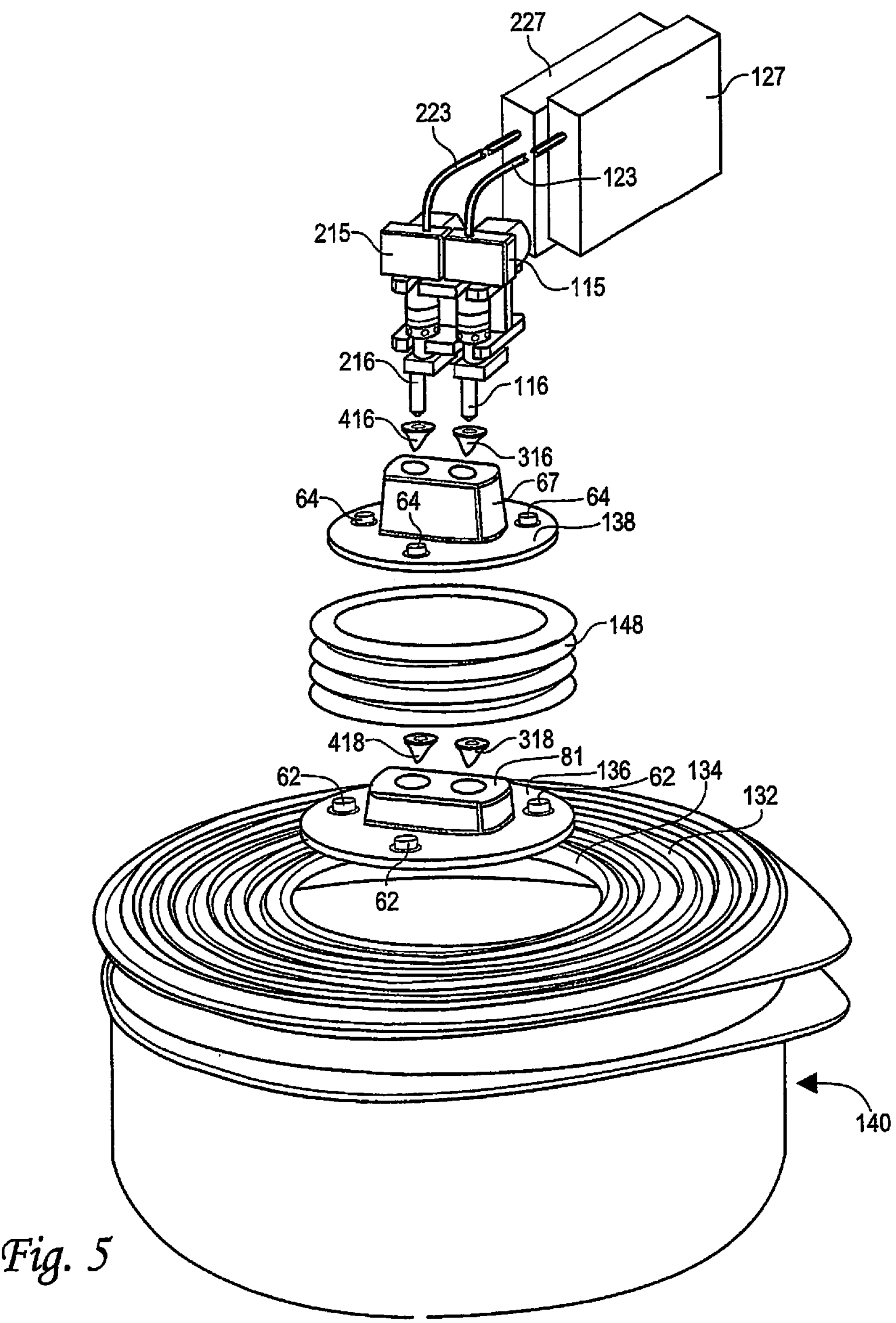
FIG. 5 is an exploded view of the apparatus of FIG. 4.

With reference to FIG. 5, the concentric pleats 132 of closed print chamber 140 have a central aperture 134 that is closed by a flange 136 that is adhered to the rim of aperture 134. The flange 136 has a series of fixed rod supports 62 that are aligned with similar rod supports 64 in solid lid 138. Rods, not shown, allow flexing joinder of solid lid 138 and flange 136 with mini-bellows 148 compressing and expanding on command between the two members as dome 67 is pulled up and down by a vertical rod as shown in FIG. 4.

It is expected that for most printing conditions, especially where sterility is required, the upper dome with its associated duckbill valves will be snapped firmly to the lower solid lid or solid flange with its associated duckbill valves aligned with the upper duckbill valves. The pleated material bonded to the upper and lower lids will create a sealed mini-bellows enclosing the airspace between the upper and lower set of duckbill valves. When printing is completed and the printing nozzle/dispensers are being removed, they will be slowly withdrawn from the lower set of duckbill valves. This will allow the lower valves to snap closed and close the passage for air into the sterile space enclosing the newly printed part. After this first stage of removal, the nozzles can be withdrawn from the upper duckbill without risk of contaminated air traveling into the printing space beneath the lower duckbill valves. At this point, the air within the mini-bellows should be considered contaminated and once the nozzles are all removed; the pleated material and upper dome can even be torn free and disposed of.

For applications of food printing, where absolute sterility of the print area post-printing and removal of the nozzles is not required, but cleanliness/sanitation is desired; the upper dome, upper duckbills, and pleated material can be eliminated. This would reduce cost and complexity while still allowing for clean and sanitary printing conditions. Objects printed in this manner could completely clean until they are exposed to a minimal amount of ambient air when the nozzles are removed from the print chamber.

The tandem housings 115 and 215 receive filamentary material from respective sealed containers 127, 227 through a connected fixed sheath 123, 223. Nozzles 116 and 216 extend from respective housings 115 and 215, through duckbill seals 316 and 416 into dome 67. The nozzles will further extend through mini-bellows 148 and through duckbill seals 318 and 418 into the raised portion 81 of flange 136 so that the nozzles extend slightly beyond the flange. The Z-motion control is able to move nozzles 116 and 216 in close proximity to an article being printed for layer deposition. If a UV-curable material is being deposited, a UV source of light, now shown, within print chamber 140, applies UV radiation as needed.

The entire chamber 140 is closed for partial sterility and to exclude moisture. Filamentary material is protected from exposure to ambient air from its supply in sealed containers 127 and 227, into the cartridges associated with housings 115 and 215. The thermoplastic filamentary material is heated and ejected via nozzles 116, 216 toward an article being printed.

Figure 6:
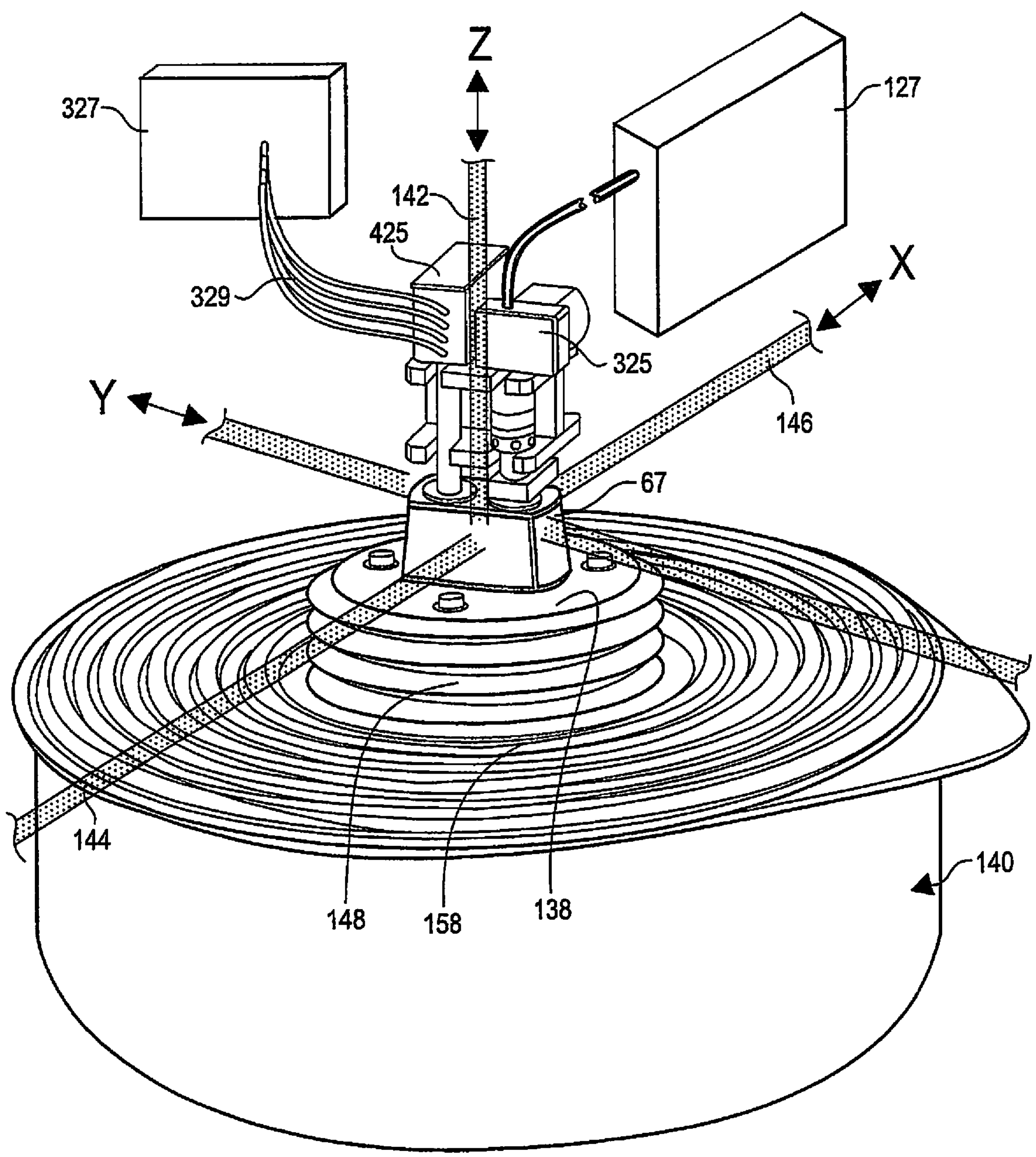
FIG. 6 is a plan view of a dual cartridge material dispenser seated in a closed 3D printing environment, the cartridges being of diverse kinds.

FIG. 6 shows tandem cartridges 325 and 425 having nozzles extending through dome 67 and through flange 138 into mini-bellows 148 for depositing printing material within chamber 140 with X, Y, Z motion control, as in FIG. 4. Cartridge 325 is depositing filamentary thermoplastic material using a filament advancing mechanism as described in FIG. 1. Cartridge 425 is simultaneously depositing ink from a reservoir 327 through feeder tubes 329. The ink must compatible with the thermoplastic material and could be support material for the filamentary material, or vice-versa. Cartridge 325 is a standard inkjet cartridge but the ink is adapted for 3D printing. Ink cartridge 425 is replaced when printing with different ink. Similarly cartridge 325 is removed and replaced when depositing a different thermoplastic material, or for cleaning. An overall objective is to maintain a closed, sterile environment in chamber 140 for 3D printing of biological articles, food, electronics, chemicals, devices or structures. The chamber 140 may contain an inert gas or any non-reactive gas. Gas supply ports in the side wall of chamber 140, not shown, can be used to maintain appropriate pressure as the volume of the chamber changes.

Figure 7:
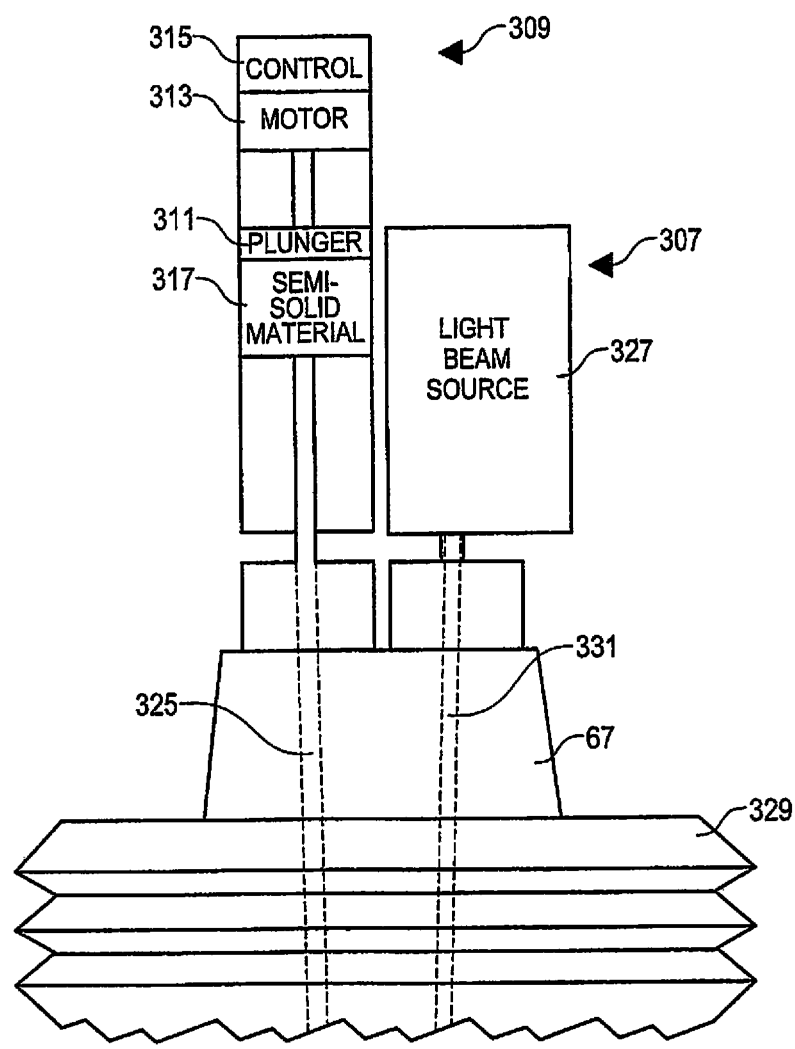
FIG. 7 is a plan view of a material dispense cartridge adjacent to a beam source cartridge in a closed 3D print environment.

3D printing equipment exists to extrude semi-solid paste material for applications such photoresist dispensing. With reference to FIG. 7, if the removable cartridge is replaced with a sealed, removable guided plunger 311 driven by a stepper motor 313 and a controller 315 and the extrusion nozzle 325 extends down through the dual-duckbill configuration, sterile printing of semi-solid material 317 such as photoresist or food items is easily achieved. Again as previously disclosed, a second or third nozzle could spray other materials with evaporative properties such as icing or chemical binder.

A UV or laser source 327 inserted through one or more of the dual-duckbill configurations would allow curing of deposited material. The chamber 329 could be provided with an inexpensive tube with a lens glued to the end within the closed print chamber. The open end would be open to the external environment so that a laser or UV light beam source 327 could be inserted and removed for print usage. This lens tube could be inserted through the dual-duckbill configuration or permanently sealed and fused in the lid to allow the laser/UV source energy to be directed by the X-Y platform positioning controlled by the printing equipment. A filling tube would be provided into the closed print chamber to add precise amounts of UV/laser cure material to the pool of material surrounding the printed part as each layer of raw material is reacted by the UV/laser source. As the X-Y-Z stage moves back and forth, a wiper mounted to the bottom side of the lid within the print chamber could level each new layer of liquid material in preparation for curing via UV/laser energy.

Additionally, disclosed is an embodiment providing a filling or evacuation tube to dispense powder into the closed print chamber or to evacuate unused material from the closed print chamber after printing is completed. As the X-Y-Z stage moves back and forth, a wiper mounted to the bottom side of the lid within the print chamber could level each new layer of powdered material in preparation for sintering via laser energy or to be bound in place by a binder material sprayed onto the print surface.

Alternatively in FIG. 7 a first cartridge 309, secured to dome 67, contains viscous semi-solid material 317 such as photoresist paste or food. The material 317 is situated in a canister in which a plunger 311 serves as a lid. As the plunger is formed downwardly semi-solid material is extruded into nozzle 325. The nozzle 325 is movable in the X-Y-Z direction by bellows 329, as described above. The nozzle 325 extending through buckbill valves, not shown, terminates over an article to be fabricated by additive manufacturing. The plunger 311 is actuated by motor 313 under command of control electronics 315 which may be a microcontroller.

Photoresist may be deposited in a line pattern to be hardened with actinic radiation. The width of the pattern depends upon nozzle tip diameter, with greater widths formed by overlapping parallel lines. Food product may be deposited in the same way.

A second cartridge 307, also secured to dome 67, houses a light beam source 327, such as a laser, generating a beam of actinic radiation 331, passing through a nozzle, not shown, to the vicinity of the tip of nozzle 325 for the purpose of curing or hardening photoresist. In this manner, line patterns of sterile material may be formed inside of housing 329.

Once the semi-solid material in first cartridge 309 is used or no longer needed, the cartridge may be removed and replaced. For example, a cartridge with positive resist material may be a three-dimensional structure, or for separating electrically conductive traces of material with insulative traces. Similarly, cartridge 307 may be removed and replaced with a light source having a different wavelength or curing characteristic. For example, a light source in the visible range may be replaced by a UV source or an infrared source. The housing 329 is moved as previously described to guide formation of 3D structures.

Figure 8:
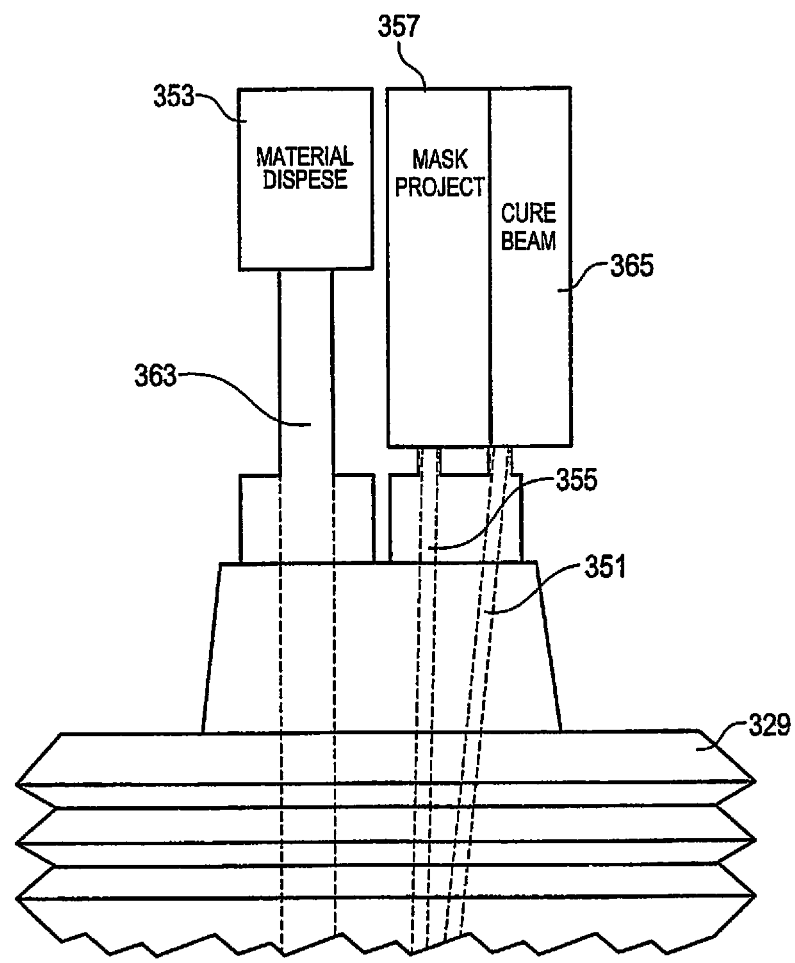
FIG. 8 is a plan view of a material dispense cartridge adjacent to a beam source cartridge, both cartridges adjacent to a pattern projector.

In FIG. 8 a UV/laser light energy beam 351 is used to cure or sinter liquid or powder material from dispenser 353. A glass-bottom tube fused into the lower lid or flange in the sealed printing environment could alternatively be a box-shaped tube 355 with a glass window fused in place. This embodiment would facilitate utilization of a DLP or LED projection chip 357 inserted into the top of the tube to project specific geometry upon the light activated material, such as photoresist from dispenser 353 deposited in the print area. As this method of imparting energy into the print area could transfer large portions of the slice geometry of each new level into the print area all at once rather than as a linear extrusion, 3D print time would be drastically decreased. A less rapid method would be utilizing laser energy being directed through the glass window into the print area in patterns representing a portion of the slice area. Thus energy could be imparted to the print surface much quicker than through linear extrusion or by moving the laser in a linear path.

Alternatively, in FIG. 8 a material dispense cartridge 353 extrudes semi-solid material into nozzle by any method or means previously disclosed. A preferred material is photoresist. A light projection cartridge 357 houses a photomask that projects a pattern onto the photoresist through the tubular nozzle 355 onto a work surface. The projected pattern may be a line pattern, an area pattern, or a mixed line and area pattern. A light beam cartridge 365, adjacent to the projection cartridge directs a beam of actinic radiation into nozzle 351 and onto the projected pattern to cure the photoresist corresponding to the projected pattern. This is carried out in the same manner as semiconductor photolithography, except that patterns are formed and cured gradually, as bellows 329 is moved along X-Y-Z axes.

An article being formed is completed in a sterile environment. Body parts, such as bone replacement pieces, tissue replacements and even human organ repair pieces may be fabricated in a sealed environment that ensures that internal portions of the fabricated article are sterile, as well as external surfaces.

What is claimed is:

1. A sealed dispenser of fluid material for additive manufacturing of articles by layer formation of dispensed material comprising:

a housing with a sealed detachable cartridge and heated plenum dispensing fluid material from a pair of nozzles, the nozzles movable in the Z-direction;

a table supporting an article for additive layer manufacturing movable in the X-Y direction below the nozzles and enclosed in a sealed variable volume, expandable wall container adjacent to the housing with a sealed entrance between the container and the housing for said nozzles, the article formed by X,Y,Z motion of the nozzles and the table.

2. The apparatus of claim 1 wherein the cartridge has an opening receiving solid thermoplastic material.

3. The apparatus of claim 2 wherein the housing has a motor driving a gear in the cartridge in contact with the thermoplastic material for driving the material into the heated plenum.

4. The apparatus of claim 1 wherein the variable volume container has a pleated side wall or a pleated top wall.

5. A sealed dispenser of fluid material for additive manufacturing of articles by layer formation of dispensed material comprising:

a housing mounted for relative motion with respect to an article to be formed by deposition of layers, the housing having at least one removable closed cartridge having sterile material, the cartridge supplying motive force to the sterile material in the cartridge;

a heated closed plenum connected to the cartridge below the housing connected to the conduit for receiving and heating the sterile material to flow viscosity; and a nozzle connected to heated plenum below the plenum with an orifice for dispensing heated material from the heated plenum to form a layer during the relative motion of the housing with respect to the article.

6. The apparatus of claim 5 wherein the cartridge is connected to the housing with frangible clips that break upon removal of the cartridge from the housing.

7. The apparatus of claim 5 wherein the sterile material is a thermoplastic filament.

8. The apparatus of claim 5 wherein the thermoplastic filament contains cells.

9. The apparatus of claim 5 wherein the article to be formed is supported on an X-Y table moving below the nozzle and the housing and nozzle are adapted for motion in the z direction and an inert gas filled variable volume container is connected between the housing and the X-Y table surrounding the housing whereby air is prevented from contacting the article to be formed.

10. The apparatus of claim 9 wherein the variable volume container has a pleated wall.

11. A sealed dispenser of fluid material for additive manufacturing of articles by layer formation of dispensed material comprising:

a housing mounted for relative motion with respect to an article to be formed by deposition of layers, the housing having a detachable closed cartridge with an opening receiving a sheath enclosing a movable thermoplastic filament provided from a supply reel, the housing supporting a drive motor communicating power to a drive gear and to an idler, the drive gear and idler in the cartridge spaced apart a distance to provide a passageway in drive relation in order for the filament to be partially deformed as it is advanced between the drive gear and the idler, the cartridge having a conduit below the drive gear and idler shaped to receive filament material from the drive gear and idler, the conduit exposed to a motor driven fan in the housing, the fan blowing cool air over the conduit;

a heated closed plenum connected to the cartridge below the housing connected to the conduit for receiving and melting filament to flow viscosity;

a nozzle connected to heated plenum below the plenum with an orifice for dispensing melted material flow from the heated plenum to form a layer during the relative motion of the housing with respect to the article;

whereby detaching the cartridge from the housing removes the sheath, drive gear, idler, conduit, heated plenum and nozzle, thereby allowing replacement with a fresh cartridge, closed plenum and nozzle.

12. The apparatus of claim 11 wherein the cartridge is connected to the housing with frangible clips that break upon removal of the cartridge from the housing so that cartridge may not be reused with the housing.

13. The apparatus of claim 11 wherein the conduit has spaced apart annular fins for convective cooling of the conduit.

14. The apparatus of claim 11 wherein the thermoplastic filament is a biopolymer.

15. The apparatus of claim 11 wherein the thermoplastic filament contains cells.

16. The apparatus of claim 11 wherein the drive motor is a stepper motor.

17. The apparatus of claim 11 further comprising a sealed filament supply box supporting the supply reel.

18. The apparatus of claim 17 wherein the supply reel has sterile filament.

19. The apparatus of claim 11 wherein the article to be formed is supported in an enclosure on an X-Y table moving below the nozzle and the housing and nozzle are adapted for motion in the z direction.

20. The apparatus of claim 19 wherein the enclosure is an air-impervious accordion pleated bellows connected between the housing and the X-Y table surrounding the housing whereby air is prevented from contacting the article to be formed.

21. A sealed dispenser of fluid material for additive manufacturing of articles by layer formation of dispensed material comprising:

a variable volume container movable in the Z-direction supporting an article for additive layer manufacturing;

a sealed first detachable cartridge communicating with the container and having semi-solid material extrudable into a nozzle, the nozzle having an opening directed onto said article with deposition of material onto the article;

a second detachable cartridge communicating with the container and having a light source directing a beam toward the opening of said nozzle impinging on the article; and a table connected to the variable volume container in the region of the article and movable in the X-Y direction.

22. The apparatus of claim 21 further comprising a third detachable cartridge communicating with the container and projecting a mask pattern onto the semi-solid material deposited on the article.

* * * * *